United States Patent [19]
West et al.

[11] Patent Number: 5,630,282
[45] Date of Patent: May 20, 1997

[54] GAGE, SYSTEM, AND METHOD FOR MEASURING CAN BLANK SLITTER KNIVES SPACING

[75] Inventors: Garvin T. West, Greer; Ronnie D. Lee, Union; Darnell Palmer, Magness; Sammy G. Middlebrooks; Joe E. Willis, both of Spartanburg; Clifton S. Burnett, Inman, all of S.C.

[73] Assignee: Crown Cork & Seal Company, Inc., Philadelphia, Pa.

[21] Appl. No.: 496,077

[22] Filed: Jun. 28, 1995

[51] Int. Cl.$^6$ ............................................. B27G 23/00
[52] U.S. Cl. .................... 33/635; 33/201; 33/501.06; 33/628
[58] Field of Search ................. 33/635, 201, 501.05, 33/501.06, 501.08, 613, 626, 628, 633, 634, 710; 83/522.18, 522.19, 522.22

[56] References Cited

U.S. PATENT DOCUMENTS

| | | | |
|---|---|---|---|
| 602,788 | 4/1898 | Shimer | 33/635 |
| 660,005 | 10/1900 | Davis et al. | 33/635 |
| 809,037 | 1/1906 | Walker | 33/635 |
| 1,960,751 | 5/1934 | Morrison | 33/628 |
| 2,458,344 | 1/1949 | Carroll | 33/626 |
| 2,622,332 | 12/1952 | Paul | 33/501.05 |
| 2,700,993 | 2/1955 | Pence | 33/201 |
| 2,872,736 | 2/1959 | Abbott | 33/637 |
| 3,104,470 | 9/1963 | Plante | 33/501.06 |
| 3,235,968 | 2/1966 | Wertepny | 33/501.06 |
| 3,252,222 | 5/1966 | Daniels | 33/627 |
| 3,726,018 | 4/1973 | Brenneisen | 33/501.06 |
| 4,630,378 | 12/1986 | Kulp et al. | 33/628 |
| 4,993,167 | 2/1991 | Durfee, Jr. | 33/626 |
| 5,069,098 | 12/1991 | Cavagna | 83/62.1 |
| 5,167,077 | 12/1992 | Etchell | 33/501.06 |
| 5,402,584 | 4/1995 | Kessler | 33/501.06 |

FOREIGN PATENT DOCUMENTS

| | | |
|---|---|---|
| 237650 | 2/1962 | Australia . |
| 223039 | 10/1968 | Sweden . |

OTHER PUBLICATIONS

"Digital Roller Cutter Measurement System" Operating Instructions, Mawag Maschinenbau AG, Switzerland, 1993.
"VRZ 450 Bidirectional Counter" Operating Instructions, Heidenhain Co., Germany. (Date Unknown).

*Primary Examiner*—Christopher W. Fultron
*Attorney, Agent, or Firm*—Woodcock Washburn Kurtz Mackiewicz & Norris

[57] ABSTRACT

A positioning device for conveniently and accurately positioning the deformation edges of two deformation tools that includes a support structure, a securing device to secure the gage to one tool, a moveable anvil that is urged against the other tool, and measurement gage that measures the distance between the deformation edges of the tools and compares it to what the distance would be if the edges were a predetermined distance apart.

20 Claims, 3 Drawing Sheets

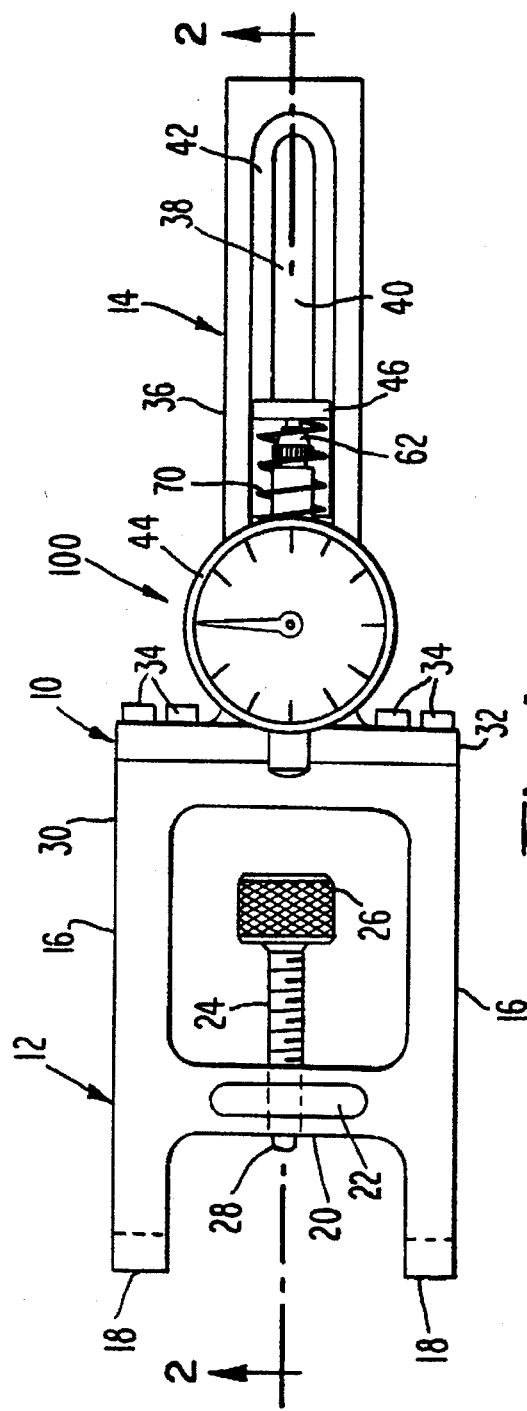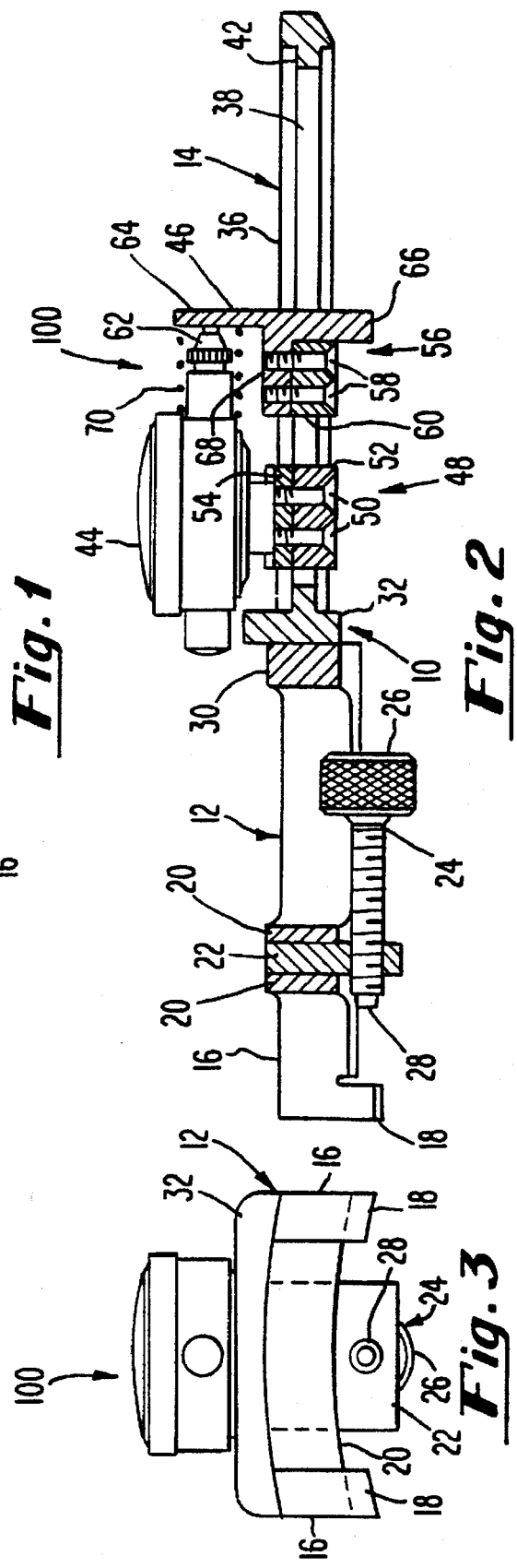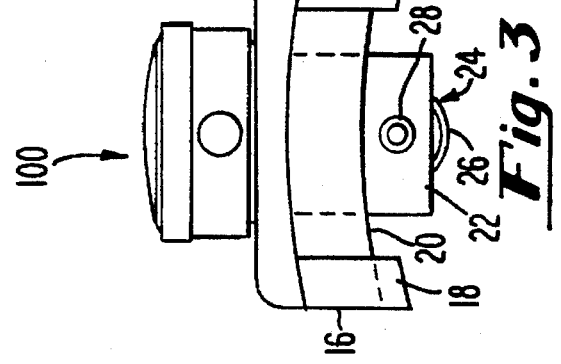

GAGE, SYSTEM, AND METHOD FOR MEASURING CAN BLANK SLITTER KNIVES SPACING

BACKGROUND OF THE INVENTION

1. Field of the Invention

This invention relates generally to the field of performing parallel deformations upon sheets of material. More specifically, it relates to a positioning device used to measure the distance between deformation tools. Even more specifically, it relates to a positioning device used to measure the distance between the cutting edges of two knives in a can blank slitter machine.

2. Description of the Related Technology

To make the body of a three piece can, a large sheet of metal is cut into smaller can blanks by a can blank slitter, which includes a first series of knives that are arranged to make parallel slits in a sheet of metal. This results in the sheet of metal being cut into strips. A can blank slitter also has a second series of knives that are arranged to make parallel slits across the strips of metal. The resulting rectangular pieces of sheet metal are the can blanks that eventually become the body of a three piece can.

Typically, the knives in a can blank slitter are metal disks mounted to a shaft. The knives are arranged such that their central axes are coextensive with each other and the shaft's central axis. The cutting edge of a knife is one of the two edges of its cylindrical, perimeter surface.

The accurate and precise setting of knives in a can blank slitter machine is crucial to can quality. Can blanks must be cut to within a tolerance of $5/1000$ of an inch for the length and $2/1000$ of an inch for the height to have proper welds on the final can. Improper welds can result in gaps in a can or a burst weld seam.

In the past, knives have been set using a "GO-NO GO" gage measuring the distance between the knives and a commercial slitter set-up gage. Both of these methods have their short comings.

One shortcoming of the "GO-NO GO" gage is that it does not measure the distance between the two cutting edges. The cutting edges of all the knives in a series are either the right edge or the left edge, not mixed. Since the "GO-NO GO" gages measure the distance between a cutting edge and a non-cutting edge, the distance between the cutting edges is not being directly measured. Since the distance is not being directly measured, the possibility of inaccurate and imprecise knife placement results.

Another shortcoming of the "GO-NO GO" gage is that the gage assumes the disks are the same thickness. The "GO-NO GO" gage operates on the principle that the distance between two cutting edges is the distance between the facing surfaces of the knives plus the thickness of a knife. However, in actual use the knives are ground down, changing their thickness. The "GO-NO GO" gage does not allow for variations in knife thickness. This results in a lesser degree of control of the setting of the knives, resulting in inaccurate and imprecise can blanks being cut.

Two shortcomings of a commercial slitter set-up gage, such as "MAWAG" Digital Roller Cutter Measurement System, are its technological complexity and expense. The distance between the knives is measured by moving a pawl from one knife to the other knife, measuring the distance the pawl travels, generating an electrical signal representing that distance. The results of the measurement are displayed electronically. The result of using this technology is a system costing thousands of dollars.

It is clear that there has existed a long and unfulfilled need in the prior art for an improved gage to position can blank slitter knives that is accurate, precise, not technologically complex, and inexpensive.

SUMMARY OF THE INVENTION

Accordingly, it is an object of the invention to provide an improved gage for positioning can blank slitter knives more conveniently and accurately than was heretofore possible.

It is further an object of the invention to provide an inexpensive gage for positioning slitter knives.

It is yet a further object of the invention to provide a gage for positioning slitter knives quickly.

In order to achieve the above and other objects of the invention, a positioning device for positioning two can blank slitter knives a predetermined distance apart according to a first aspect of the invention includes a support structure with a means to attach the positioning device to one knife, a member that is positioned against the other knife, and a gage that measures and displays the difference between the actual distance of the knives and a predetermined distance.

A system for positioning two can blank slitter knives a predetermined distance apart according a second aspect of the invention includes the above mentioned positioning device and a standard for calibrating the positioning device a predetermined distance, the standard having a ridge onto which the positioning device can be secured and having a stop against which the member can be positioned against, the ridge and stop configured and arranged to allow the positioning device to be configured and arranged to allow it be used to position the deformation edges a predetermined distance apart from each other.

A method for positioning two can blank slitter knives a predetermined distance apart according to a third aspect of the invention includes providing the above mentioned positioning device, calibrating the positioning device with the above mentioned standard, securing the positioning device to one knife, urging the member against the second knife, and changing the distance between the knives until they are the predetermined distance apart.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 1 is a top plan view of a gage for measuring can slitter knife spacing that is constructed according to the preferred embodiment of the invention;

FIG. 2 is a sectional view of the gage as taken along line 2—2 in FIG. 1;

FIG. 3 is a front view of the gage that is depicted in FIGS. 1 and 2;

DETAILED DESCRIPTION OF THE PREFERRED EMBODIMENT(S)

Figure 4:
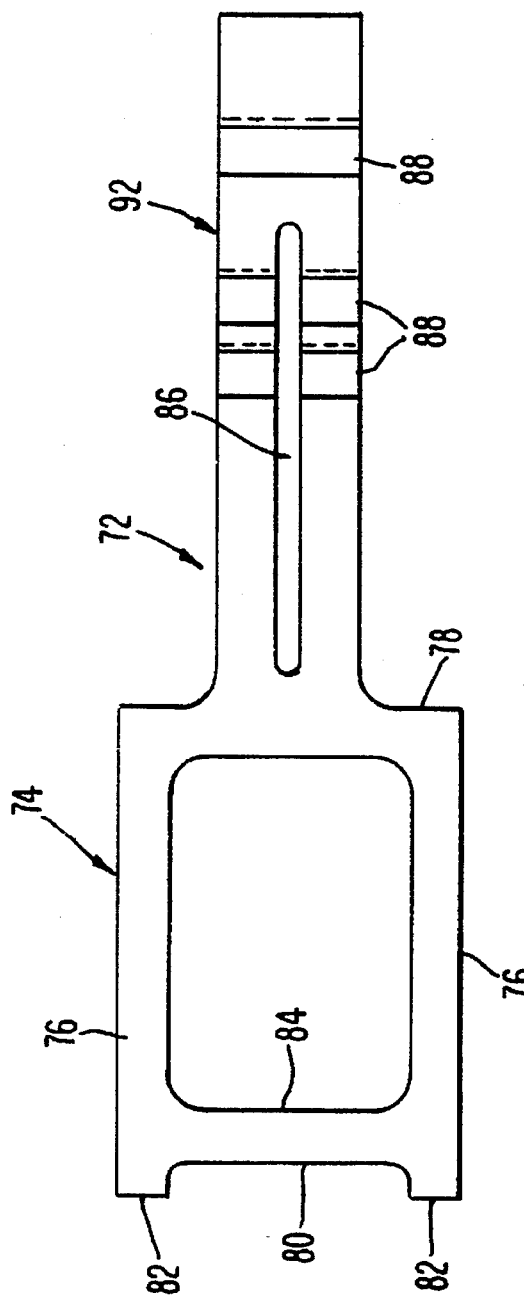
FIG. 4 is a top view of the gage set-up fixture in the assembly shown in FIGS. 1–3.

Referring now to the drawings, wherein like reference numerals designate corresponding structure throughout the views, and referring in particular to FIGS. 1, 2, and 3, a gage 100 that is constructed according to a preferred embodiment of the invention includes a support structure 10 having securing portion 12 and a measuring portion 14. As may be seen in FIG. 1, securing portion 12 is basically a rectangular shape and measuring portion 14 of basically a "T" shape. In the preferred embodiment, securing portion 12 and measuring portion 14 are metal but other embodiments of the invention allow for the use of other materials.

Referring again to FIGS. 1, 2, and 3, securing portion 12 has defined at one end a securing portion attachment ridge 30, which extends the width of securing portion 12. Extending perpendicularly from securing portion attachment ridge 30 are two rigid extensions 16. Extensions 16 reside in the same plane and extend the length of securing portion 12. At the end of extensions 16 are securing lips 18. As shown in FIGS. 2 and 3, securing lips 18 extend perpendicularly and down from extensions 16. Spanning perpendicularly the distance between extensions 16 and located between securing portion attachment ridge 30 and securing lips 18 is a securing thumb screw ridge 20. As shown in FIG. 3, securing thumb screw ridge 20 does not reside in the plane defined by extensions 16, but rather it bows upward. Residing in and extending down from securing thumb screw ridge 20 and residing in the same plane defined by securing thumb screw ridge 20 is thumb screw support 22. Thumb screw support 22 is a rectangular piece of metal that is narrower than the distance between extensions 16 and is secured in thumb screw ridge 20 by two screws (not shown). Extending through the portion of thumb screw support 22 that extends below thumb screw support ridge 20 is thumb screw 24. As shown in FIG. 1, head 26 of thumb screw 24 is located approximately between extensions 16, securing portion attachment ridge 30, and securing thumb screw ridge 20. Further, thumb screw tip 28 is located between securing thumb screw ridge 20 and securing lips 18. Thumb screw 24 is oriented parallel to extensions 16 and perpendicular to thumb screw ridge 20. Securing portion 12 is designed and arranged to allow a rigid object (not shown) to be secured against securing lips 18 by pressure that is applied to the rigid object by thumb screw tip 28, the pressure coming from the turning of thumb screw 24.

Referring again to FIGS. 1, 2, and 3, coextensive with securing portion attachment ridge 30 and opposed to extensions 16 is measuring portion attachment ridge 32. Measuring portion attachment ridge 32 and securing portion attachment ridge 30 are attached by screws 34 that extend through both of the components. Measuring portion attachment ridge 32 comprises the cross member of the "T" in the "T" shape of measuring portion 14. The vertical member of the "T" in the "T" shape of measuring portion 14 is dial indicator base 36. Dial indicator base 36 extends perpendicularly from measuring portion attachment ridge 32 and resides in the plane formed by extensions 16. Extending along the main axis of dial indicator base 36 but not through to the ends of the base is gage and anvil track 38. Gage and anvil track 38 is inclusive of slot 40 extending down and through dial base indicator 36 and track ridge 42, which runs the perimeter of slot 40 and extends into slot 40.

Referring to FIG. 2, dial indicator 44 and anvil 46 are mounted to dial indicator base 36 by dial indicator mounting assembly 48 and anvil mounting assembly 56 respectively. Dial indicator 44 is located between anvil 46 and securing portion 12. Dial indicator 44 is a standard dial indicator gage with a movable stem 62. Dial indicator 44 indicates the difference in the extension of movable stem 62. Dial indicator mounting assembly 48 includes screws 50, plate clamp 52, and dial indicator saddle 54. Plate clamp 52 is disposed below track ridge 40 and is designed to conform to track ridge 42 and the wall of slot 40 below track ridge 42. Dial indicator saddle 54 is disposed above track ridge 42 and below dial indicator 44 and is designed to conform to track ridge 42, the wall of slot 40 above track ridge 42, and the underside of dial indicator 44. Screws 50 extend up through plate clamp 52, through dial indicator saddle 54, and into the underside of dial indicator 44. Dial indicator mounting assembly 48 is designed and arranged to allow the assembly to traverse slot 40 and, when screws 50 are tightened, to secure dial indicator 44.

Referring again to FIG. 2, anvil 46 is a "T" shaped piece of metal in which the cross member of the "T" is measurement extension 64 and calibration extension 66 and vertical member is anvil clamping ridge 68. As shown in FIG. 2, the "T" of anvil 46 is on its side, with anvil clamping ridge 68 extending to the left, towards dial indicator 44, measurement extension 64 extending up, and calibration extension 66 extending down. Referring now to FIGS. 1 and 2, anvil 46 is located to the right and is adjacent to dial indicator 44. Anvil 46 is positioned such that calibration extension 66 extends down through slot 40, anvil clamping ridge 68 conforms to the top of track ridge 42 and the walls of slot 40 above track ridge 42, and measurement extension 64 extends up from dial indicator base 36. Anvil 46 is secured to dial indicator base 36 by anvil mounting assembly 56. Anvil mounting assembly 56 is comprised of screws 58 and plate clamp 60. Plate clamp 60 is disposed below track ridge 42 and is designed to conform to track ridge 42 and the wall of slot 40 below track ridge 42. Screws 58 extend up through plate clamp 60 and into anvil clamping ridge 68 of anvil 46. Anvil 46 and anvil mounting assembly 56 are designed to allow anvil 46 to traverse slot 40 while maintaining the plane formed by measurement extension 64 and calibration extension 66 in a perpendicular position relative to the main axis of dial base indicator 36.

Referring to FIGS. 1 and 2, dial indicator 44 and anvil 46 are arranged to allow stem 62 to come into contact with measurement extension 64. To ensure anvil 46 is as far from dial indicator 44 as possible, anvil spring 70 is located around stem 62, urging anvil 46 away from dial indicator 44.

Figure 5:
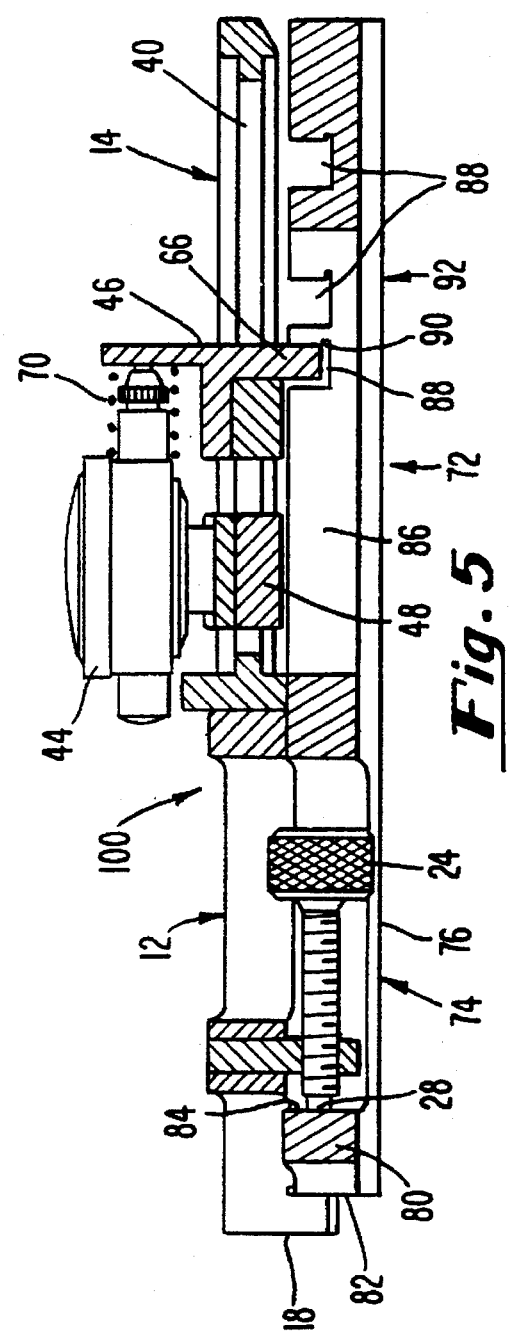
FIG. 5 is the sectional view of the gage shown in FIGS. 1–4, with the gage mounted on the gage set-up fixture.

Referring now to FIGS. 4 and 5, gage set-up fixture 72 is the fixture that is used to calibrate gage 100. A more generic term to describe "gage-set fixture" is "predetermined distance standard." Gage set-up fixture 72 has basically the same shape as gage 100 in FIG. 1 in the preferred embodiment. Corresponding to securing portion 12 and measurement portion 14 in FIG. 1 is secured portion 74 and calibration portion 92, respectively, in FIG. 4. A difference in gage 100 and gage set-up fixture 72 is that the latter is fabricated from a single piece of metal in the preferred embodiment.

Looking again to FIGS. 4 and 5, secured portion 74 is comprised of two extensions 76 that are parallel to each other and two cross pieces 78 and 80 that are parallel to each other and perpendicular to extensions 76. Cross piece 78 (which is analogous to attachment ridges 30 and 32 in FIG. 1), attaches one set of corresponding ends of extensions 76. Cross piece 80 attaches to extensions 76 near, but not at, the other set of corresponding ends of extensions 76. This arrangement results in a rectangular frame in which one of the sides of the frame has been slid towards the middle of the frame, creating a rectangular hole and a "U" shaped profile at the side where extensions 76 extend. At the end of each extension 78 that extends beyond cross piece 80 is securing lips contact surface 82. At the side of cross piece member 80 that faces cross piece 78 is thumb screw contact surface 84.

Referring to FIGS. 4 and 5, calibration portion 92 extends from cross piece 78, in the same plane formed by extensions 76 but away from extensions 76. Additionally, calibration portion extends from the center of cross piece 78 while extensions 76 extend from the end of cross piece 78. Following the main axis of calibration portion 92, but not extending through the end of calibration portion 92, is screw access slot 86. Screw access slot 86 extends down through calibration portion 92. Running parallel to cross piece 78 are calibration grooves 88. In the preferred embodiment, three calibration grooves 88 are present, each one representing a different distance to set can blank slitter knives. Referring in particular to FIG. 5, calibration grooves 88 extend part way down into calibration portion 92. Calibration grooves 88 are sized to accommodate calibration extension 66 of anvil 46. Calibration stop 90 is the wall of any calibration groove 88 that is furthest from secured portion 74. The distance between calibration stop 90 and securing lips contact surface 82 is the predetermined calibration distance of cutting edges of the can blank slitter machine knives for a specific can blank width.

Referring to FIG. 5, gage 100 is mounted on gage set-up fixture 72 in the calibration position. Cross piece 80 is positioned such that securing lips contact surface 82 is in contact with securing lips 18 and thumb screw 24 has been tightened, forcing thumb screw tip 28 against thumb screw end contact surface 84, thus securing gage set-up fixture 72 in gage 100. Dial indicator 44 and anvil 46 are arranged in slot 40 such that calibration extension 66 is forced against calibration stop 90 by anvil spring 70 and calibration extension 66 is less than fully extended. After dial indicator 44 and anvil 46 are arranged, screws 50 of dial indicator mounting assembly 48 are tightened to secure dial indicator 44. Screws 50 are tightened by inserting a screw driver (not shown) through screw access slot 86 and tightening. After that is accomplished, dial indicator is zeroed, thumb screw 24 is loosened and gage set-up fixture 72 removed from gage 100. Gage 100 is now ready to calibrate the distance between two knives.

Figure 6:
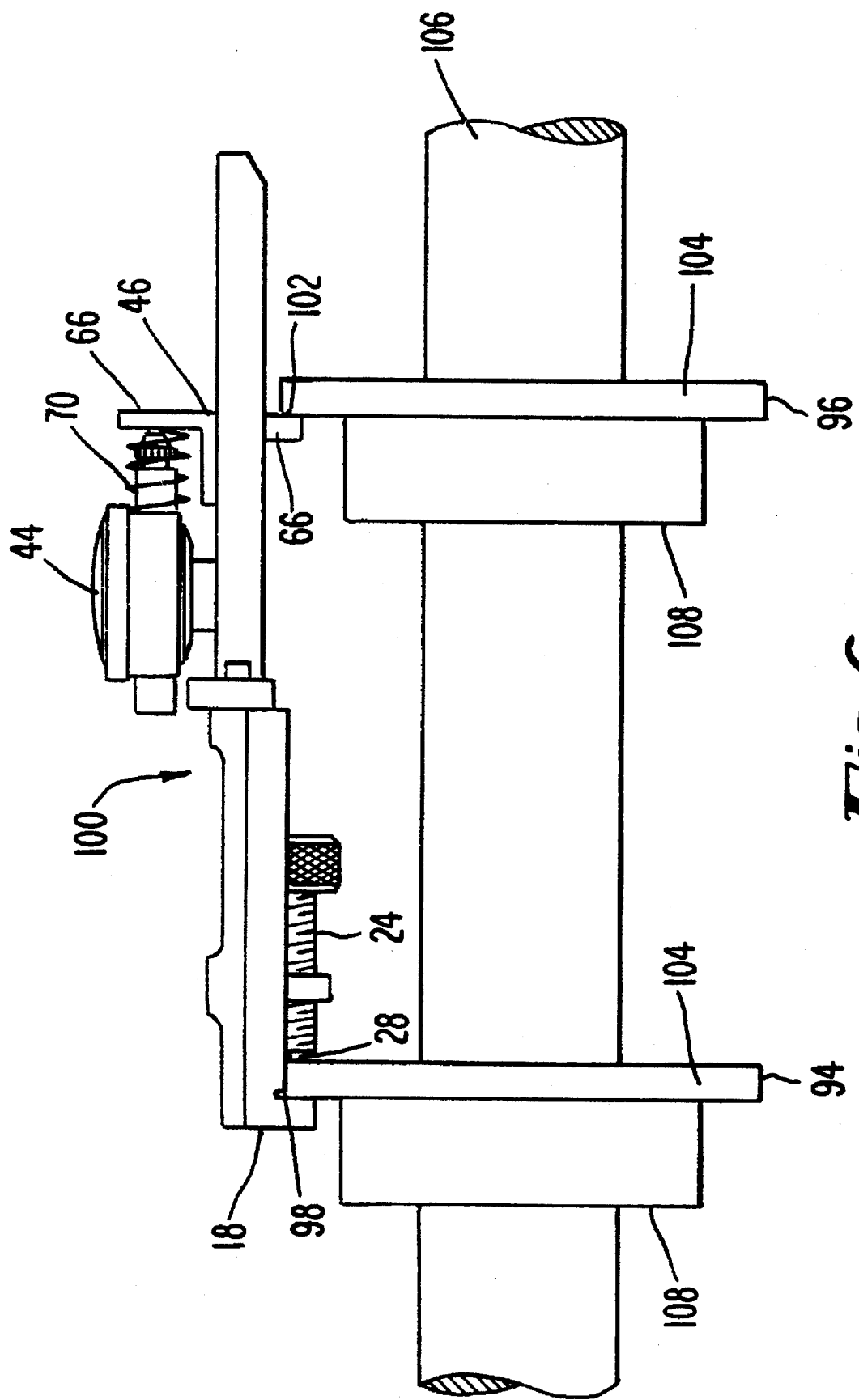
FIG. 6 is a side view of the gage shown in FIGS. 1–5, mounted on a set of can blank slitter knives.

Referring to FIG. 6, gage 100 is mounted on a set of knives in order to calibrate the distance between a first knife 94 and a second knife 96. Or more accurately, to calibrate the distance between cutting edge 98 of first knife 94 and cutting edge 102 of second knife 96. In other embodiments of the invention, gage 100 can be used to calibrate not just the distance between the cutting edges of knives, but the distances between the deformation edges of any material deformation tools.

Referring to FIG. 6, the knife on the left is first knife 94 and the other knife is second knife 96. As FIG. 6 is a side view, only cylindrical side surface 104 of each knife is visible and not the circular surfaces of the disc-shaped knives 94 and 96. Cutting edge 98 of first knife 94 is the corner of the cylinder-shaped disc-like knife formed where cylindrical side surface 104 meets the left circular surface (not shown) of knife 94. Similarly, cutting edge 102 of second knife 96 is the corner of the cylinder-shaped, disc-like knife formed where cylindrical side surface 104 meets the left circular surface (not shown) of knife 96.

Referring to FIG. 6, extending through the center of the circular surfaces of knives 94 and 96 is shaft 106. When a can blank slitter machine is in operation, shaft 106 rotates around its main axis, causing the knives on it to rotate also. Knives 94 and 96 are secured to shaft 106 by hubs 108. Hubs 108 are attached to knives 94 and 96 respectively and have a smaller diameter than knives 94 and 96. Hubs 108 can utilize hydraulic force to remain static on shaft 106 or can be secured by screws (not shown).

Referring to FIG. 6, gage 100 is secured to first knife 94 to allow the distance between cutting edges 98 and 102 to be calibrated to secure gage 100. Securing lips 18 are placed against first knife 94's circular surface adjacent to cutting edge 98. Next, thumb screw 24 is been tightened, forcing thumb screw tip 28 against first knife 94 to secure knife 94 against securing lips 18. Additionally, calibration extension 66 of anvil 46 is urged against second knife 96's circular surface adjacent to cutting edge 102 by anvil spring 70. In this position, dial indicator 44 will display the difference between the calibration distance and the distance of the two cutting edges 98 and 102. By moving either knife, but preferably second knife 96, the distance between cutting edges 98 and 102 can be adjusted until the cutting edges distance is calibrated. Note that the thickness of either disk is not a factor in setting the distance between cutting edges 98 and 102 as gage 100 determines the distance between the cutting edges 98 and 102 directly. In another embodiments of the invention, gage 100 can be arranged to measure the distance between the facing circular faces of the knives or the opposing circular faces of the knives.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A positioning device for conveniently and accurately positioning a first deformation edge of a first material deformation tool a predetermined distance from a second deformation edge of a second material deformation tool, comprising:

a support structure;

securing means, attached to said support structure, for securing the positioning device adjacent to the first material deformation tool;

a member movably mounted to said support structure;

said member, said support structure, and said securing means being configured and arranged such that when said securing means secures said support structure to the first material deformation tool, said member is in contact with the second material deformation tool; and measurement means mounted to said support structure for measuring the difference between where said member is positioned and where said member would be positioned when the positioning device is secured to the first deformation tool, said member is in contact with the second deformation tool, and the deformation edges are located a predetermined distance apart from each other.

2. The positioning device of claim 1, wherein said securing means comprises a contact surface, a thumb screw support, and a thumb screw piercing said thumb screw support, said thumb screw having a thumb screw tip, in which said contact surface, said thumb screw support, and said thumb screw are configured and arranged such that when the first material deformation tool is in contact with said contact surface, said thumb screw is rotated such that said thumb screw tip moves away from said thumb screw support and towards said contact surface until said thumb screw tip urges and secures the first material deformation tool against said contact surface.

3. The positioning device of claim 2 wherein said measurement means comprises a dial indicator.

4. The positioning device of claim 3 further comprising urging means to urge said member towards the second material deformation tool when the positioning device is secured to the first deformation tool and said member is in contact with the second deformation tool.

5. The positioning device of claim 4 wherein said urging means is comprised of a spring located between said dial indicator and said member.

6. The positioning device of claim 5 wherein the first and second material deformation tools are circular knives, movably mounted on a shaft such that said knives' central axes are coextensive with each other and said shaft's central axis, and the first and second deformation edges are the cutting edges of said circular knives.

7. A system for conveniently and accurately positioning a first deformation edge of a first material deformation tool a predetermined distance from a second deformation edge of a second material deformation tool comprising:
a positioning device comprising:
a support structure;
securing means, attached to said support structure, for securing the positioning device adjacent to the first material deformation tool;
a member movably mounted to said support structure;
said member, said support structure, and said securing means being configured and arranged such that when said securing means secures said support structure to the first material deformation tool, said member is in contact with the second material deformation tool; and
measurement means mounted to said support structure for measuring the difference between where said member is positioned and where said member would be positioned when the positioning device is secured to the first deformation tool, said member is in contact with the second deformation tool, and the deformation edges located a predetermined distance apart from each other; and
a predetermined distance standard comprising a ridge and at least one stop, said ridge and said stop configured and arranged such that when said ridge is secured in said securing means, said member can be positioned adjacent to said stop, allowing the positioning device to be configured and arranged to allow it be used to position the deformation edges a predetermined distance apart from each other.

8. The system of claim 7, wherein said securing means comprises a contact surface, a thumb screw support, and a thumb screw piercing said thumb screw support, said thumb screw having a thumb screw tip, in which said contact surface, said thumb screw support, and said thumb screw are configured and arranged such that when the first material deformation tool is in contact with said contact surface, said thumb screw is rotated such that said thumb screw tip moves away from said thumb screw support and towards said contact surface until said thumb screw tip urges and secures the first material deformation tool against said contact surface.

9. The system of claim 8, wherein said measurement means comprises a dial indicator.

10. The system of claim 9, further comprising urging means to urge said member towards the second material deformation tool when the positioning device is secured to the first deformation tool and said member is in contact with the second deformation tool.

11. The system of claim 10, wherein said urging means is comprised of a spring located between said dial indicator and said member.

12. The system of claim 11 wherein said first and second material deformation tools are circular knives, movably mounted on a shaft such that said knives' central axes are coextensive with each other and said shaft's central axis, and the first and second deformation edges are the cutting edges of said circular knives.

13. The system of claim 12, further comprising a can blank slitter machine in which are mounted said circular knives.

14. A method for conveniently and accurately positioning a first deformation edge of a first material deformation tool a predetermined distance from a second deformation edge of a second material deformation tool comprising:
providing a positioning device comprising:
a support structure;
securing means, attached to said support structure, for securing the positioning device adjacent to the first material deformation tool;
a member movably mounted to said support structure;
said member, said support structure, and said securing means being configured and arranged such that when said securing means secures said support structure to the first material deformation tool, said member is in contact with the second material deformation tool; and
measurement means mounted to said support structure for measuring the difference between where said member is positioned and where said member would be positioned when the positioning device is secured to the first deformation tool, said member is in contact with the second deformation tool, and the deformation edges are located a predetermined distance apart from each other;
calibrating said positioning device using a predetermined distance standard comprising a ridge and at least one stop, said ridge and said stop configured and arranged such that when said ridge is secured in said securing means, said member can be positioned adjacent to said stop, allowing said positioning device to be configured and arranged to allow it be used to position the deformation edges a predetermined distance apart from each other;
securing said securing means to the first material deformation tool;
urging said member against the second material deformation tool; and
changing the distance between the deformation tools until said measurement means announces that the deformation edges are the predetermined distance apart from each other.

15. The method of claim 14, wherein said securing means comprises a contact surface, a thumb screw support, and a thumb screw piercing said thumb screw support, said thumb screw having a thumb screw tip, in which said contact surface, said thumb screw support, and said thumb screw are configured and arranged such that when the first material deformation tool is in contact with said contact surface, said thumb screw is rotated such that said thumb screw tip moves away from said thumb screw support and towards said contact surface until said thumb screw tip urges and secures the first material deformation tool against said contact surface.

16. The method of claim 15, wherein said measurement means comprises a dial indicator.

17. The method of claim 16, further comprising urging means to urge said member towards the second material deformation tool when the positioning device is secured to the first deformation tool and said member is in contact with the second deformation tool.

18. The method of claim 17, wherein said urging means is comprised of a spring located between said dial indicator and said member.

19. The method of claim 18 wherein said first and second material deformation tools are circular knives, movably mounted on a shaft such that said knives' central axes are coextensive with each other and said shaft's central axis, and the first and second deformation edges are the cutting edges of said circular knives.

20. The method of claim 19, further comprising a can blank slitter machine in which are mounted said circular knives.

* * * * *